(12) United States Patent
Gandhi et al.

(10) Patent No.: US 10,425,378 B2
(45) Date of Patent: Sep. 24, 2019

(54) COMMENT SYNCHRONIZATION IN A VIDEO STREAM

(71) Applicant: Facebook, Inc., Menlo Park, CA (US)

(72) Inventors: Sonal Gandhi, Seattle, WA (US); Sabyasachi Roy, Renton, WA (US); Amit Puntambekar, Fremont, CA (US); Michael Hamilton Coward, Menlo Park, CA (US); Mathieu R. Henaire, Redmond, WA (US)

(73) Assignee: Facebook, Inc., Menlo Park, CA (US)

(*) Notice: Subject to any disclaimer, the term of this patent is extended or adjusted under 35 U.S.C. 154(b) by 252 days.

(21) Appl. No.: 15/384,143

(22) Filed: Dec. 19, 2016

(65) Prior Publication Data

US 2018/0176276 A1    Jun. 21, 2018

(51) Int. Cl.
*H04L 29/06* (2006.01)
*H04L 12/26* (2006.01)
*H04L 29/08* (2006.01)
*H04L 12/58* (2006.01)

(52) U.S. Cl.
CPC ............ *H04L 51/32* (2013.01); *H04L 51/046* (2013.01); *H04L 65/4084* (2013.01); *H04L 65/80* (2013.01); *H04L 67/02* (2013.01)

(58) Field of Classification Search
CPC ....... H04L 65/605; H04L 51/32; H04L 67/02; H04L 43/106
See application file for complete search history.

(56) References Cited

U.S. PATENT DOCUMENTS

| | | | | |
|---|---|---|---|---|
| 7,254,318 B2* | 8/2007 | Imada | .................. | G11B 27/034 |
| | | | | 348/E5.007 |
| 8,208,788 B2* | 6/2012 | Ando | ............... | G11B 20/00086 |
| | | | | 386/240 |
| 8,601,149 B2* | 12/2013 | Ando | ............... | G11B 20/00086 |
| | | | | 709/231 |
| 8,831,405 B2* | 9/2014 | Miyake | .................. | H04N 5/913 |
| | | | | 386/248 |
| 9,535,988 B2* | 1/2017 | Horowitz | .......... | G06F 17/30817 |
| 9,934,813 B2* | 4/2018 | Yahata | ............. | G11B 20/00181 |
| 2003/0099460 A1* | 5/2003 | Imada | .................. | G11B 27/034 |
| | | | | 386/329 |
| 2006/0182418 A1* | 8/2006 | Yamagata | ............ | G11B 27/105 |
| | | | | 386/248 |

(Continued)

*Primary Examiner* — Kostas J Katsikis
(74) *Attorney, Agent, or Firm* — Baker Botts L.L.P.

(57) ABSTRACT

In one embodiment, a computer server machine generates a time map associated with the video stream. The video stream comprises one or more time slices. The computer server machine identifies a non-relevant time frame. The computer machine receives a comment and a localized comment time stamp, and associates the comment with one or more time slices. One or more client devices communicates a request for one or more time slices to the computer server machine, and the computer server machine determines whether the localized comment time stamp is within the requested one or more time slices. When the localized comment time stamp is within the requested one or more time slices, computer server machine transforms the localized time stamp to a synchronized comment time stamp. Computer server machine sends information regarding the synchronized comment time stamp to the one or more client devices.

20 Claims, 5 Drawing Sheets

(56) References Cited

U.S. PATENT DOCUMENTS

| Publication No. | Date | Inventor | Classification | Subclass |
|---|---|---|---|---|
| 2007/0058937 A1* | 3/2007 | Ando | G11B 27/105 | 386/248 |
| 2007/0102764 A1* | 5/2007 | Ando | G11B 20/00086 | 257/355 |
| 2007/0127892 A1* | 6/2007 | Ando | G11B 20/00086 | 386/239 |
| 2007/0127893 A1* | 6/2007 | Ando | G11B 20/00086 | 386/239 |
| 2007/0127894 A1* | 6/2007 | Ando | G11B 20/00086 | 386/239 |
| 2007/0127895 A1* | 6/2007 | Ando | G11B 20/00086 | 386/239 |
| 2007/0136375 A1* | 6/2007 | Ando | G11B 20/00086 | |
| 2007/0140073 A1* | 6/2007 | Ando | G11B 20/00086 | 369/30.08 |
| 2007/0143267 A1* | 6/2007 | Ando | G11B 20/00086 | |
| 2007/0143269 A1* | 6/2007 | Ando | G11B 20/00086 | |
| 2007/0150912 A1* | 6/2007 | Ando | G11B 20/00086 | 720/718 |
| 2007/0150913 A1* | 6/2007 | Ando | G11B 20/00086 | 720/718 |
| 2007/0150914 A1* | 6/2007 | Ando | G11B 20/00086 | 720/718 |
| 2007/0150915 A1* | 6/2007 | Ando | G11B 20/00086 | 720/718 |
| 2007/0154167 A1* | 7/2007 | Ando | G11B 20/00086 | 386/243 |
| 2007/0154191 A1* | 7/2007 | Ando | G11B 20/00086 | 386/241 |
| 2007/0171559 A1* | 7/2007 | Ando | G11B 20/00086 | 360/1 |
| 2007/0172201 A1* | 7/2007 | Ando | G11B 20/00086 | 386/241 |
| 2007/0172213 A1* | 7/2007 | Ando | G11B 20/00086 | 386/248 |
| 2007/0174758 A1* | 7/2007 | Ando | G11B 20/00086 | 715/203 |
| 2007/0174759 A1* | 7/2007 | Ando | G11B 20/00086 | 715/203 |
| 2007/0177466 A1* | 8/2007 | Ando | G11B 27/105 | 369/13.01 |
| 2007/0177467 A1* | 8/2007 | Ando | G11B 27/105 | 369/13.01 |
| 2007/0177848 A1* | 8/2007 | Ando | G11B 27/105 | 386/234 |
| 2007/0177849 A1* | 8/2007 | Ando | G11B 27/105 | 386/234 |
| 2007/0177852 A1* | 8/2007 | Ando | G11B 27/105 | 386/239 |
| 2007/0177853 A1* | 8/2007 | Ando | G11B 27/105 | 386/239 |
| 2007/0177854 A1* | 8/2007 | Ando | G11B 27/105 | 386/241 |
| 2007/0177855 A1* | 8/2007 | Ando | G11B 27/105 | 386/241 |
| 2007/0180466 A1* | 8/2007 | Ando | G11B 27/105 | 725/37 |
| 2007/0183740 A1* | 8/2007 | Ando | G11B 27/105 | 386/248 |
| 2007/0196073 A1* | 8/2007 | Ando | G11B 27/105 | 386/248 |
| 2007/0196080 A1* | 8/2007 | Ando | G11B 20/00086 | 386/241 |
| 2007/0198515 A1* | 8/2007 | Ando | G11B 20/00086 | |
| 2007/0204283 A1* | 8/2007 | Ando | G11B 20/00086 | 720/718 |
| 2007/0206924 A1* | 9/2007 | Ando | G11B 20/00086 | 386/241 |
| 2007/0206925 A1* | 9/2007 | Ando | G11B 20/00086 | 386/241 |
| 2007/0206926 A1* | 9/2007 | Ando | G11B 20/00086 | 386/241 |
| 2007/0230906 A1* | 10/2007 | Ando | G11B 20/00086 | 386/241 |
| 2007/0257247 A1* | 11/2007 | Ando | G11B 27/105 | 257/3 |
| 2008/0010648 A1* | 1/2008 | Ando | G11B 20/00086 | 719/328 |
| 2009/0164904 A1* | 6/2009 | Horowitz | G06F 17/30817 | 715/723 |
| 2011/0018998 A1* | 1/2011 | Guzik | H04N 21/21 | 348/143 |
| 2011/0033172 A1* | 2/2011 | Ando | G11B 27/105 | 386/355 |
| 2012/0237181 A1* | 9/2012 | Ando | G11B 20/00086 | 386/240 |
| 2013/0054745 A1* | 2/2013 | Ando | G11B 27/105 | 709/217 |
| 2013/0058625 A1* | 3/2013 | Ando | G11B 27/105 | 386/240 |
| 2013/0084055 A1* | 4/2013 | Ando | G11B 27/105 | 386/248 |
| 2013/0124751 A1* | 5/2013 | Ando | G11B 27/105 | 709/233 |
| 2017/0046230 A1* | 2/2017 | Guzik | G06F 11/1464 | |
| 2017/0124664 A1* | 5/2017 | Savenok | H04L 12/1818 | |

* cited by examiner

COMMENT SYNCHRONIZATION IN A VIDEO STREAM

TECHNICAL FIELD

This disclosure generally relates to generating a time map for comments in a video stream.

BACKGROUND

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

In addition, the system may communicate the one or more video streams to a mobile computing device, and the mobile computing device may comment on the one or more video streams.

SUMMARY OF PARTICULAR EMBODIMENTS

Particular embodiments provide techniques to generate a time map associated with a video stream and receive and synchronize comments associated with the video stream. A computer server machine generates a time map associated with the video stream, wherein the video stream comprises one or more time slices. The computer server machine also identifies a non-relevant time frame associated with a non-relevant portion of the video stream. The computer machine receives a comment associated with the video stream and a localized comment time stamp associated with the comment, and associates the comment with one or more time slices. One or more client devices communicates a request for one or more time slices of the video stream to the computer server machine, and the computer server machine determines whether the localized comment time stamp is within the requested one or more time slices of the video stream. When the localized comment time stamp is within the requested one or more time slices of the video stream, computer server machine transforms the localized time stamp to a synchronized comment time stamp by synchronizing the localized time stamp to a counterpart time in the time map based in part on the non-relevant time frame. Computer server machine then sends information regarding the synchronized comment time stamp to the one or more client devices.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

A system may communicate one or more video streams to a mobile computing device, and the mobile computing device may comment on the one or more video streams and communicate the comment to the system.

This approach may be inefficient. For example, a user associated with the client device may comment on a scene in the video stream at different times than other users. Moreover, a video stream may contain non-relevant portions of video that may be removed from video playback. Users may also comment on the non-relevant portions of the video.

Accordingly, particular embodiments provide techniques to generate a time map associated with a video stream and receive and synchronize comments associated with the video stream. A computer server machine generates a time map associated with the video stream, wherein the video stream comprises one or more time slices. The computer server machine also identifies a non-relevant time frame associated with a non-relevant portion of the video stream. The computer machine receives a comment associated with the video stream and a localized comment time stamp associated with the comment, and associates the comment with one or more time slices. One or more client devices communicates a request for one or more time slices of the video stream to the computer server machine, and the computer server machine determines whether the localized comment time stamp is within the requested one or more time slices of the video stream. When the localized comment time stamp is within the requested one or more time slices of the video stream, computer server machine transforms the localized time stamp to a synchronized comment time stamp by synchronizing the localized time stamp to a counterpart time in the time map based in part on the non-relevant time frame. Computer server machine then sends information regarding the synchronized comment time stamp to the one or more client devices.

Figure 1:
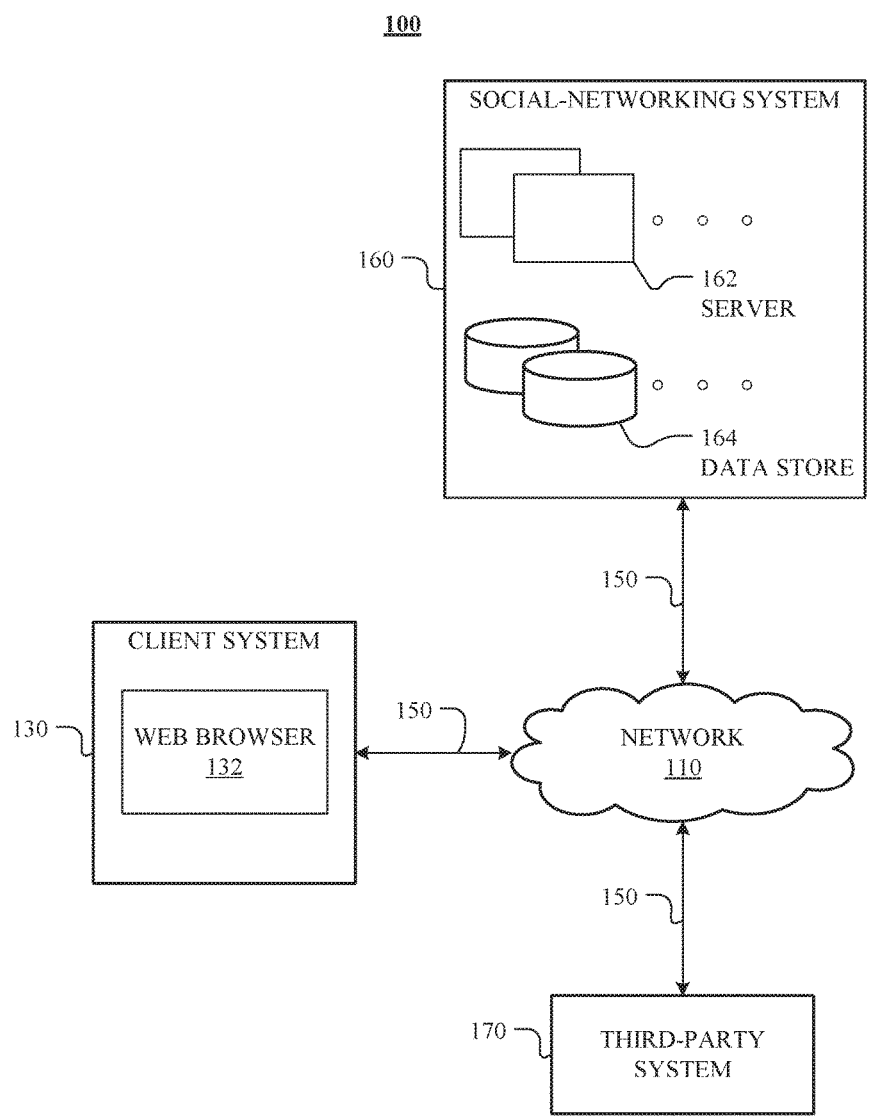
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

In certain embodiments, server 162 comprises a computer server machine. Computer server machine may be any component in social-networking system 160 and can communicate with any component inside social-networking system 160. However, although computer server machine is described herein as server 162, computer server machine may be any component that exists independent of social-networking system 160. For example, computer server machine may be a standalone module that is external to social-networking system 160. In particular embodiments, computer server machine may communicate with third-party system 170 and client system 130.

In an exemplary embodiment of operation, server 162 generates a time map associated with a video stream. A time map may contain one or more time slices. The one or more time slices may be a segmentation of the time associated with a video stream, and may be used to correlate a comment to a segment in the time map based on a time associated with the comment. In certain embodiments, the segmentation consists of a specific time period (e.g., 3 second time slices) or a dynamic time period. For example, server 162 may statistically analyze the video stream and associated comments to determine adaptive segmentations of time slices based on the frequency of comments in that segment.

Video streams may be a form of multimedia that is transmitted over the Internet in near real time. Rather than wait for the entire video to arrive, server 162 may continuously receive and capture the received live video stream. Client system 130 may capture a video stream by using a video camera, microphone, speaker, or any other mechanism to record video and/or audio. In certain embodiments, a video stream may comprise a video component, an audio component, or both a video and audio component. Client system 130 may transmit a video stream to server 162. Client system 130 may also record a video stream and communicate the recorded video stream to server 162. In certain embodiments, the time map associated with the video stream comprises an audio time map associated with the video stream. An audio time map may be an audio marker that corresponds with the audio played on client system 130. Accordingly, an audio marker of a video may stay consistent across multiple client systems 130 regardless of poor network conditions or loss of internet connection.

Moreover, video streams may comprise a video-on-demand. A video-on-demand may comprise a recorded video that client system 130 plays at a later time. In certain embodiments, users of client systems 130 may play a video-on-demand at a time of their choosing. Moreover, users of client systems 130 may pause, rewind, and/or fast forward a video-on-demand.

In certain embodiments, server 162 may also identify a non-relevant time frame associated with a non-relevant portion of the video stream. A non-relevant portion of the video channel may comprise a portion of the video stream that does not contain audio, a portion of the video channel that does not contain video, or an indication by server 162 and/or client system 130 that the portion of the video is non-relevant. In certain embodiments, one or more client systems 130 may receive a video stream wherein the non-relevant time frames are removed from the video. In certain embodiments, server 162 may automatically remove non-relevant time frames.

Server 162 may receive a comment associated with the video stream. The comment may be any type of action associated with a video stream. Comments may constitute comments, likes, or any other type of user action that is associated with the video stream. Comments may also comprise tracking user reactions (e.g., representation of a user's emotion in relation to a time period in the video stream) and metadata associated with the video stream (e.g., current live viewer count or shares of the video stream). The metadata, in particular, may comprise the current metadata of the video stream at the time the metadata was captured. For example, the metadata may comprise the current live viewer count and shares of the video stream at 5 seconds into the streaming of the video stream.

In addition to receiving a comment associated with the video stream, server 162 may receive a localized comment time stamp associated with the comment. The localized comment time stamp may be a time mark associated with the video stream. Typically, the localized comment time stamp is synchronized with the time map associated with the video stream. For example, the localized comment time stamp associated with a comment may consist of an audio marker that correlates with the audio time map. As an example, users of multiple client systems 130 may register a similar localized comment time stamp for the same scene in a video stream regardless if the users of multiple client systems 130 are watching the video stream at separate times.

Server 162 may then associate the received comment with the one or more time slices. In certain embodiments, server 162 determines the association of the received comment to the one or more time slices by using the localized comment time stamp associated with the comment. For example, if a localized comment time stamp associated with the comment indicates that the comment was made 2 seconds into the video stream, server 162 may associated the received comment with a time slice associated with 0 seconds to 3 seconds. Server 162 may associate multiple comments with multiple time slices, and may associate one or more comments to one or more time slices.

With the received comments, server 162 may continue to construct a time map associated with the video stream. As comments are received by server 162, server 162 may continue to associate the received comments to the one or more time slices.

One or more client systems 130 may request for one or more time slices of the video stream. Client system 130 may be streaming the video stream (e.g., a video-on-demand), and requesting the next set of comments associated with the next portion of the video stream. Client system 130 may actively request for one or more time slices of the video stream, or computer server machine 132 may automatically communicate one or more time slices of the video stream to client system 130. In certain embodiments, server 162 may communicate the one or more time slices of the video stream alongside a portion of the video stream.

Computer server machine may then determine whether the localized comment time stamp of the received comment is within the requested one or more time slices of the video stream. For example, if client system 130 requests a time slice of the portion of the video stream from 3 seconds into the video stream to 6 seconds into the video stream, client system 130 may determine whether any received comments have a localized comment time stamp within that indicated portion of the video stream.

When the localized comment time stamp is within the requested one or more time slices of the video stream, server 162 may transform the localized time stamp to a synchronized comment time stamp by synchronizing the localized time stamp to a counterpart time in the time map based in part on the non-relevant time frame. In certain embodiments, server 162 determines the period of time to shift the localized time by identifying a period of time associated with the non-relevant portion of the video channel. Server 162 may then transform the localized time stamp to a synchronized comment time stamp by shifting the localized time stamp by the period of time associated with the non-relevant portion of the video channel.

In certain embodiments, server 162 may determine whether the localized comment time stamp associated with the comment is within the time frame associated with the non-relevant time frame of the video stream. Server 162 may shift the localized time stamp to a neighboring time slice in the time map in order to transform the localized time stamp to a synchronized comment time stamp. In doing so, server 162 may preserve the relationship between comments since portions of the non-relevant time frame may be removed.

Moreover, in certain embodiments, server 162 may determine whether the localized comment time stamp associated with the comment is outside the time frame associated with the non-relevant time frame of the video stream. In certain embodiment, server 162 may only send information regarding the comment and the synchronized comment time when the localized comment time stamp is outside the time frame associated with the non-relevant time frame of the video stream. Similarly, in certain embodiments, server 162 may refrain from sending information regarding the comment and the synchronized comment time when the localized comment time stamp is within a time frame associated with the non-relevant time frame of the video stream.

Server 162 may communicate information regarding the comment and the synchronized comment time stamp to one or more client systems 130. Server 162 may communicate the information directly to one or more client systems 130 or through an intermediary device. Moreover, server 162 may communicate information regarding multiple comments and each comments synchronized comment time stamp to one or more client systems 130. Server 162 may also communicate information for multiple time slots. In certain embodiments, server 162 may communication information regarding the identified non-relevant time frame of the video stream to one or more client systems 130. In certain embodiments, server 162 may communicate the identified relevant time frame of the video stream to one or more client systems 130 in order to communicate a highlight reel of the video stream. For example, a highlight reel of the video stream may comprise the relevant time frames of the video stream.

In certain embodiments, a comment may be a child comment of a parent comment. Server 162 may communicate an indication that the comment is a child comment of a parent comment alongside the comment and the synchronized comment time stamp to the one or more client systems 130.

Server 162 may also store the comment and synchronized comment time stamp in data store 162. Upon receiving a second request for one or more time slices of the video stream, server 162 may access data store 162 to retrieve the comment and synchronized comment time stamp in data store 162 rather than compute the synchronized comment time stamp. Server 162 may receive additional comments, transform the comment's localized time stamp to the synchronized comment time stamp, and store the additional comments and associated synchronized comment time stamp to data store 162.

Figure 2:
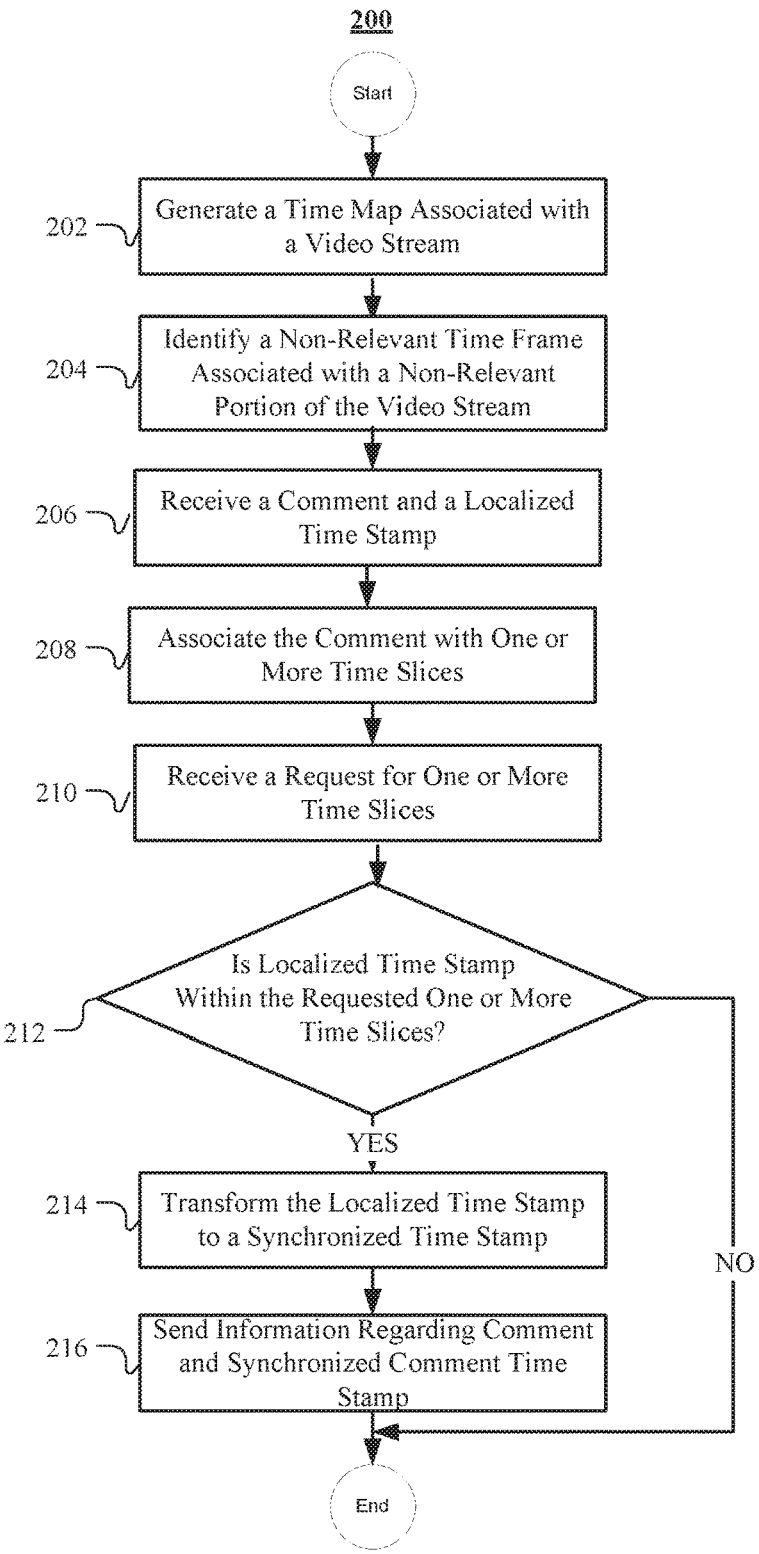
FIG. 2 illustrates an example method for generating a time map and synchronizing the localized comment time stamp.

FIG. 2 illustrates an example method 200 for generating a time map and synchronizing the localized comment time stamp. The method may begin at step 202, where server 162 generates a time map associated with a video stream. A time map may contain one or more time slices. The one or more time slices may be a segmentation of the time associated with a video stream, and may be used to correlate a comment to a segment in the time map based on a time associated with the comment. In certain embodiments, the segmentation consists of a specific time period or a dynamic time period.

At step 204, server 162 identifies a non-relevant time frame associated with a non-relevant portion of the video stream. A non-relevant portion of the video channel may comprise a portion of the video stream that does not contain audio, a portion of the video channel that does not contain video, or any other non-relevant portion of the video stream. In certain embodiments, one or more client systems 130 may receive a video stream wherein the non-relevant time frames are removed from the video. Moreover, the disclosure contemplates server 162 identifying relevant time frames of a video stream, and performing calculations on the associated comment time stamp based on the relevant time frames. In particular embodiments, the social-networking system 160 may perform one or more suitable pre-processing steps, such as compressing, cropping, resizing, reducing the noise, or correcting the color of the video stream.

At step 206, server 162 may receive a comment and a localized time stamp associated with the comment from one or more client systems 130. The comment may be any type of action associated with a video stream. Comments may constitute comments, likes, or any other type of user action that is associated with the video stream. Similarly, the localized comment time stamp may be a time mark associated with the video stream. In particular embodiments, server 162 may perform one or more suitable pre-processing steps to the comment, such as removing certain numbers and punctuation (including the "#" character in a hashtag), removing or replacing special characters and accents, translating the comment to one or more languages, and/or lower-casing all text. Similarly, server 162 may perform one or more suitable pre-processing steps to the localized comment time stamp, such as adjusting the localized comment time stamp to a specific time zone.

In certain embodiments, server 162 may cache the comments associated with the one or more time slices. Moreover, server 162 may cache the video stream associated with the time map.

At step 208, server 162 associates the comment with one or more time slices in the generated time map. In certain embodiments, server 162 determines the association of the received comment to the one or more time slices by using localized comment time stamp associated with the comment. Server 162 may associate multiple comments with multiple time slices, and may associate one or more comments to one or more time slices.

One or more client systems 130 may request for one or more time slices of the video stream at step 210. For example, client system 130 may be streaming the video stream (e.g., a video-on-demand), and requesting the next set of comments associated with the next portion of the video stream. Server 162 may then determine whether the localized comment time stamp of the received comment is within the requested one or more time slices of the video stream at step 212. If the localized comment time stamp of the received comment is not within the requested one or more time slices of the video stream, the method ends. However, if server 162 is within the requested one or more time slices of the video stream, the method proceeds to step 214.

At step 214, server 162 transforms the localized time stamp associated with the comment to a synchronized time stamp. Server 162 may transform the localized time stamp to a synchronized comment time stamp by synchronizing the localized time stamp to a counterpart time in the time map based in part on the non-relevant time frame. In certain embodiments, server 162 determines the period of time to shift the localized time by identifying a period of time associated with the non-relevant portion of the video channel. Server 162 may then transform the localized time stamp to a synchronized comment time stamp by shifting the localized time stamp by the period of time associated with the non-relevant portion of the video channel.

At step 216, server 162 sends information regarding the comment and the synchronized comment time stamp associated with the comment to one or more client systems 130. Moreover, server 162 may cache the comment and synchronized comment time stamp associated with the comment such that server 162 may provide the comment and synchronized comment time stamp without calculating the synchronized comment time stamp again.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for identifying and sending interesting events of one or more video streams in a video session including the particular steps of the method of FIG. 2, this disclosure contemplates any suitable method for identifying and sending interesting events of one or more video streams in a video session including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3A:
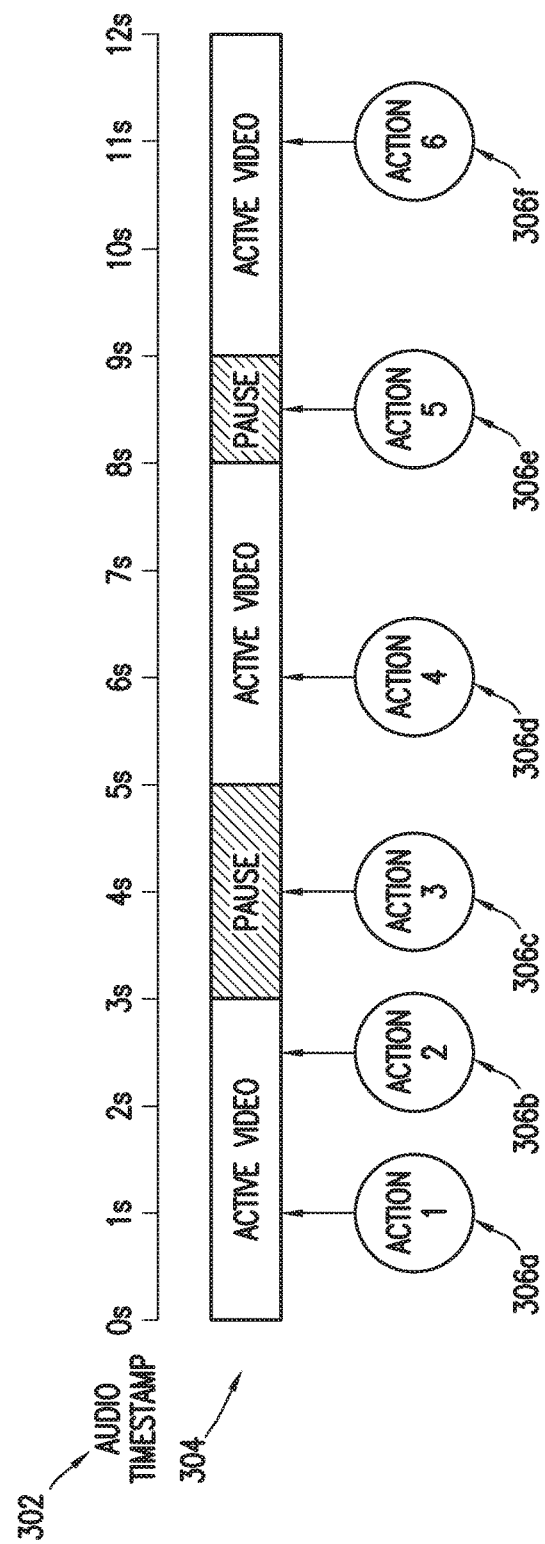
FIGS. 3A-C illustrate an example comment synchronization diagram and generated time maps.
Figures 3B, 3C:
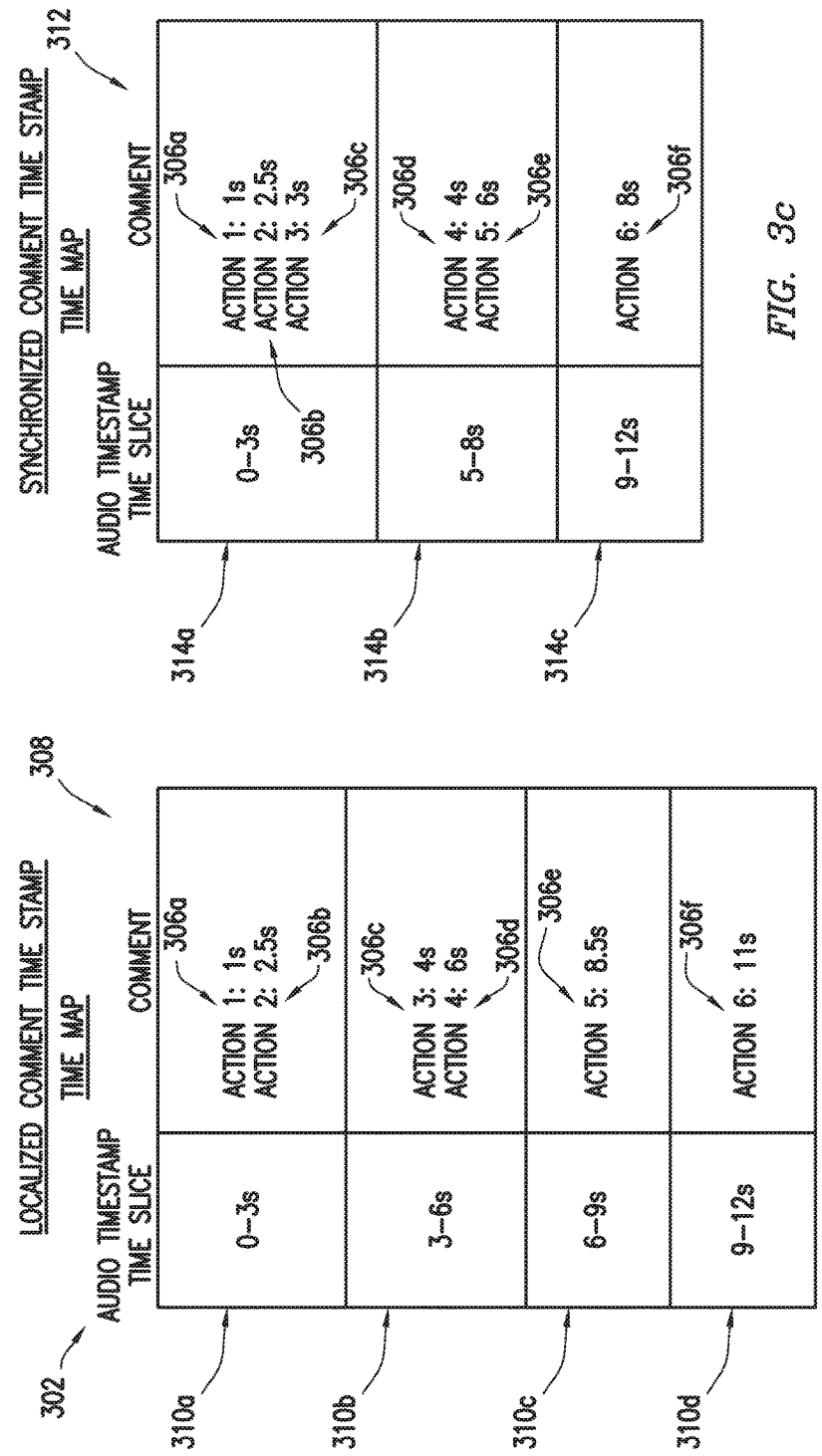

FIGS. 3A-C illustrate an example comment synchronization diagram and generated time maps. More particularly, FIG. 3A-C illustrate server 162 receiving a plurality of comments and associated comment time stamps, generating a time map, and synchronizing the comment time stamp.

FIG. 3A illustrates an example communication of comments and associated comment time stamps between client system 130 and social-networking system 160. Social-networking system 160 may contain server 162; server 162 may comprise a computer server machine.

Audio timestamp 302 is a time stamp of the video stream. Although illustrated as an audio timestamp, audio timestamp 302 may be a visual timestamp or any other type of time stamp that can be synchronized with multiple client systems 130.

Video stream illustration 304 is a visual illustration of a video stream. Video stream illustration may contain segments of active video and segments of non-relevant portions (e.g., pause moments). Active video segments (such as those illustrated between 0-3 seconds, 5-8 seconds, and 9-12 seconds) may be portions of the video stream that contain content. Non-relevant portions (such as those illustrated between 3-5 seconds and 8-9 seconds) illustrate portions of the video that are not relevant to the video stream, and, in certain embodiments, server 162 may remove from the video stream during video playback. In the illustrated embodiment, the non-relevant portions are indicated by pauses in the video stream. Non-relevant portions may be indicative of internet failure, exiting the video recording program, or any other types of action that causes a portion to not be relevant to the video stream. For example, pauses may occur due to bad wireless connectivity, interruptions occurring during the video stream (e.g., received texts, received calls, background applications), insufficient processing power, high latency, or any other problems that may delay the transmission and/or display of a video stream. Non-relevant portions may also be indicative of portions of the video stream that one or more users wish to remove from the video stream. In certain embodiments, server 162 and/or one or more client systems 130 identify the non-relevant portions of the video stream and may also remove the non-relevant portions of the video stream for video playback.

Action indicators 306 represent actions received from one or more client systems 130. Action indicators 306 can be indicative of a comment received, a like received, or any other type of interaction one or more client systems 130 had in relation to the video stream. Action indicators 306*a*-306*f* are visual representations of a comment received and localized comment time stamp.

FIG. 3B illustrates a generated time map associated with the localized comment time stamp by server 162.

As illustrated, server 162 may generate a time map 308 with time slots 310*a*-*d*. As illustrated, time slots 310*a*-310*d* are in segmentations of 3 seconds. Time slot 310*a*, 310*b*, 310*c*, and 310*d* are, respectively, a representation of comments with localized comment time stamps between 0-3 seconds, 3-6 seconds, 6-9 seconds, and 9-12 seconds.

Server 162 may associate actions 306*a*-306*f* with one or more time slices. In the illustrated embodiment, server 162 associates time slot 310*a* with action 306*a* with localized time stamp of 1 second and action 306*b* with localized time stamp of 2.5 seconds. Similarly, server 162 associates time slot 310*b* with action 306*c* with localized time stamp of 4 seconds and action 306*d* with localized time stamp of 6 seconds. Likewise, server 162 associates time slot 310*c* with action 306*e* with localized time stamp of 8.5 seconds, and time slot 310*d* with action 306*f* with localized time stamp of 11 seconds.

FIG. 3C illustrates a time map 312 associated with synchronized comment time stamps generated by server 162. Server 162 generates a synchronized comment time stamp by transforming the localized comment time stamp of the comment.

Server 162 identifies the non-relevant portions of the video stream. In the illustrated embodiment, the non-relevant portion of the video stream are between 3 to 5 seconds and 8 to 9 seconds in audio timestamp 302.

Server 162 may receive a request from one or more client systems 130 for one or more time slices of the video stream. For example, client systems 130 may request time slices 314*a*-314*c*. Time slices 314*a*-314*c* represent time slices pertaining to relevant information of video stream 304.

When client devices request time slice 314*a*, server 162 determines whether one or more comments is within the requested time slice 314*a*. Server 162 determines that actions 306*a* and 306*b* are in requested time slice 314*a*. In the illustrated embodiment, server 62 may not transform actions 306*a* and 306*b* because actions 306*a* and 306*b* do not follow a non-relevant time period.

In the illustrated embodiment, server 162 also determines that action 306*c* is also within requested time slice 314*a*. Server 162 may determine that a localized comment time stamp associated with the comment, such as action 306*c*, is within a time frame associated with the non-relevant time frame of the video stream. Server 162 may transform the localized time stamp associated with action 306*c* to a synchronized comment time stamp by shifting the localized time stamp to a neighboring time slice. In order to shift the localized time stamp to the neighboring time slice 314*a* of 0-3 seconds, server 162 may transform the localized time stamp of 4 seconds for action 306*c* to a synchronized time stamp of 3 seconds by shifting the time stamp by 1 second.

Similarly, when client system 130 requests time slice 314*b*, server 162 determines that action 306*d* is within requested time slice 314*b*. Server 162 may then transform the localized time stamp of action 306*d* to a synchronized comment time stamp by shifting the localized time stamp. Server 162 may determine the period of time to shift the localized time by identifying a period of time associated with the non-relevant portion of the video channel. In the illustrated embodiment, computer server machine 62 may transform the localized time stamp of action 306*d* to a synchronized comment time stamp by shifting the localized time stamp by 2 seconds to account for the removed non-relevant time portion between 3-5 seconds on audio timestamp 302. Accordingly, server 162 may transform the localized comment timestamp of 6 seconds for action 306*d* to a synchronized comment time stamp of 4 seconds.

Server 162 may determine that action 306*e* is within a time frame associated with the non-relevant time frame of the video stream. Server 162 may transform the localized time stamp associated with action 306*e* to a synchronized comment time stamp by shifting the localized time stamp twice: first, to a neighboring time slice and, second, by a time period associated with the non-relevant portion of the video channel. In the illustrated embodiment, server 162 transforms the localized time stamp of 8.5 seconds for action 306*e* twice: once by shifting the localized time stamp to 8 seconds (i.e., the neighboring time slice) and then by 2 seconds on account for the portion of non-relevant time period preceding it. Accordingly, server 162 transforms the localized time stamp of 8.5 seconds to a synchronized comment time stamp of 6 seconds.

Client device may also request time slice 314*c*. Server 162 may determine that action 306*f* is within requested time slice 314*c*. Server 162 may then transform the localized time stamp by first determining a period of time associated with the one or more non-relevant time periods. In this illustration, two non-relevant time periods exist: (1) from 2-5 seconds and (2) from 8-9 seconds. Accordingly, computer server machine 62 may transform the localized time stamp of action 306*f* to a synchronized comment time stamp by shifting the localized time stamp by 3 seconds to account for the removed non-relevant time portion between 3-5 seconds and between 8-9 seconds on audio timestamp 302.

As detailed above, FIGS. 3A-3C illustrate server 162 receiving a plurality of comments and associated comment time stamps, generating a time map, and synchronizing the comment time stamp. Table 1 below comprises an additional representation of the generation of the time map and synchronization for the comment time stamp as shown in FIGS. 3A-3C. As illustrated in FIG. 3A, pauses in the video stream occur at time intervals 3-5 s and 8-9 s.

TABLE 1

| Localized Comment Time Stamp Time Map | | | | Synchronized Comment Time Stamp Time Map | | |
|---|---|---|---|---|---|---|
| Comment | Comment Time Period | Time Interval | Comment Time Stamp Transformation | Comment | Comment Time Period | Time Interval |
| Action 1 | 1 s | 0-3 s | Not Applicable | Action 1 | 1 s | 0-3 s |
| Action 2 | 2.5 s | | Not Applicable | Action 2 | 2.5 s | |
| Action 3 | 4 s | 3-6 s | −1 s (due to pause in time interval 3-5 s) | Action 3 | 3 s | |
| Action 4 | 6 s | | −2 s (due to pause in time interval 3-5 s) | Action 4 | 4 s | 5-8 s |
| Action 5 | 8.5 s | 6-9 s | −2.5 s (due to pause in time intervals 3-5 s and 8-9 s) | Action 5 | 6 s | |

TABLE 1-continued

| Localized Comment Time Stamp Time Map | | | Synchronized Comment Time Stamp Time Map | | | |
|---|---|---|---|---|---|---|
| Comment | Comment Time Period | Time Interval | Comment Time Stamp Transformation | Comment | Comment Time Period | Time Interval |
| Action 6 | 11 s | 9-12 s | −3 s (due to pause in time intervals 3-5 s and 8-9 s) | Action 6 | 8 s | 9-12 s |

Figure 4:
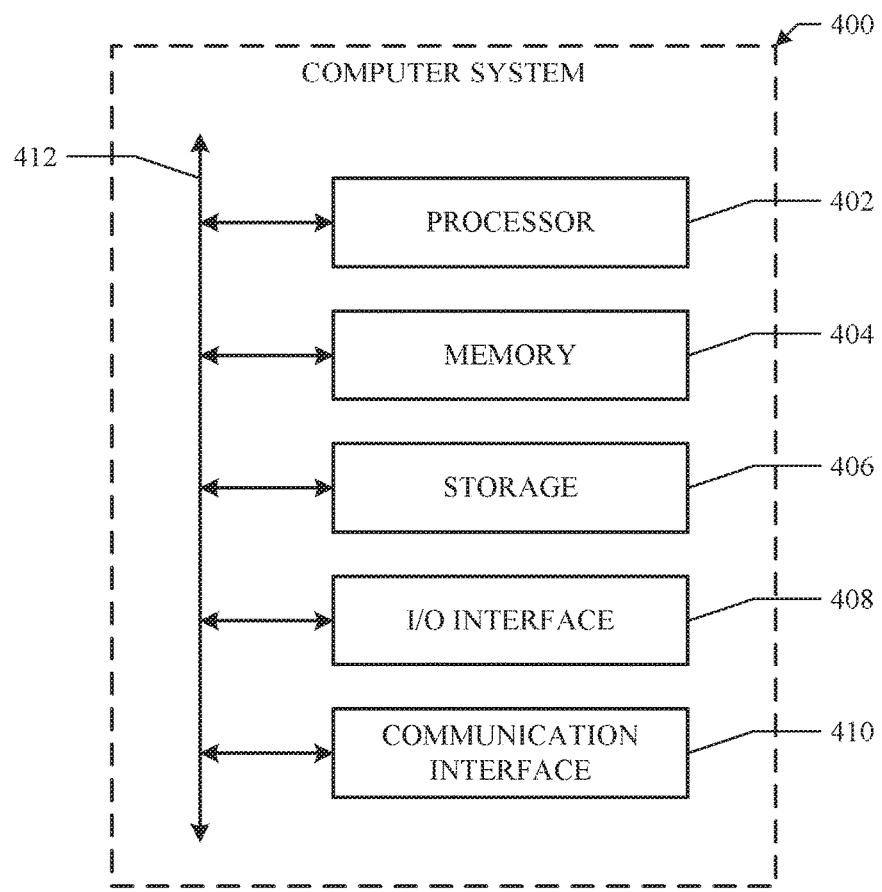
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   by a computer server machine, generating a first time map associated with a video stream, the first time map comprises one or more time slices;
   by the computer server machine, identifying a non-relevant time frame associated with a non-relevant portion of the video stream;
   by the computer server machine, associating a comment associated with the video stream with one or more of the time slices, wherein the comment is associated with a localized comment time stamp;
   by the computer server machine, in response to a request for the one or more of the time slices associated with the localized comment time stamp, transforming the time map by synchronizing the localized comment time stamp to a counterpart time in the time map associated with the video stream excluding the non-relevant time frame based in part on the non-relevant time frame; and
   by the computer server machine, sending information regarding the comment and the synchronized comment time stamp to one or more client devices.

2. The method of claim 1, wherein transforming the time map by synchronizing the localized time stamp to a counterpart time in the time map associated with the video stream excluding the non-relevant time frame based in part on the non-relevant time frame further comprises:
   shifting the localized comment time stamp by a period of time associated with the identified non-relevant portion of the video stream.

3. The method of claim 1, further comprising:
   by the computer server machine, determining whether the localized comment time stamp is within the time frame associated with the non-relevant time frame of the video stream; and
   wherein transforming the time map by synchronizing the localized comment time stamp to a counterpart time in the time map associated with the video stream excluding the non-relevant time frame based in part on the non-relevant time frame further comprises shifting the localized time stamp to a neighboring time slice in the time map when the localized time comment time stamp is within the time frame associated with the non-relevant portion of the video stream.

4. The method of claim 1, further comprising:
   by the computer server machine, determining whether the localized comment time stamp is outside the time frame associated with the non-relevant time frame of the video stream; and
   wherein sending information regarding the comment and the synchronized comment time stamp occurs when the localized time comment time stamp is outside the time frame associated with the non-relevant portion of the video stream.

5. The method of claim 1, wherein the time map associated with the video stream comprises an audio time map associated with the video stream.

6. The method of claim 1, further comprising:
   by the computer server machine, storing the comment and the synchronized comment time stamp;
   by the computer server machine, receiving a second request for the one or more time slices of the video stream; and
   by the computer server machine, sending information regarding the comment and the synchronized comment time stamp to the one or more client devices.

7. The method of claim 1, wherein the video stream comprises a live video and the request for the one or more time slices of the video stream is associated with a video-on-demand.

8. One or more computer-readable non-transitory storage media embodying software that is operable when executed to:
   generate a time map associated with a video stream, the time map comprises one or more time slices;
   identify a non-relevant time frame associated with a non-relevant portion of the video stream;
   associate a comment associated with the video stream with one or more of the time slices, wherein the comment is associated with a localized comment time stamp;
   in response to a request for the one or more of the time slices associated with the localized comment time stamp, transform the localized comment time stamp to a synchronized comment time stamp by synchronizing the localized comment time stamp to a counterpart time in the time map associated with the video stream excluding the non-relevant time frame based in part on the non-relevant time frame; and
   send information regarding the comment and the synchronized comment time stamp to the one or more client devices.

9. The media of claim 8, wherein transforming the localized comment time stamp to a synchronized comment time stamp by synchronizing the localized comment time stamp to a counterpart time in the time map associated with the video stream excluding the non-relevant time frame based in part on the non-relevant time frame further comprises:
   shifting the localized comment time stamp by a period of time associated with the identified non-relevant portion of the video stream.

10. The media of claim 8, wherein the software is further operable when executed to:
    determine whether the localized comment time stamp is within the time frame associated with the non-relevant time frame of the video stream; and wherein transforming the time map by synchronizing the localized comment time stamp to a counterpart time in the time map based in part on the non-relevant time frame further comprises shifting the localized comment time stamp associated with the video stream excluding the non-relevant time frame to a neighboring time slice in the time map when the localized comment time stamp is within the time frame associated with the non-relevant portion of the video stream.

11. The media of claim 8, wherein the software is further operable when executed to:
 determine whether the localized comment time stamp is outside the time frame associated with the non-relevant time frame of the video stream; and
 wherein sending information regarding the comment and the synchronized comment time stamp occurs when the localized time comment time stamp is outside the time frame associated with the non-relevant portion of the video stream.

12. The media of claim 8, wherein the time map associated with the video stream comprises an audio time map associated with the video stream.

13. The media of claim 8, wherein the software is further operable when executed to:
 store the comment and the synchronized comment time stamp;
 receive a second request for the one or more time slices of the video stream; and
 send information regarding the comment and the synchronized comment time stamp to the one or more client devices.

14. The media of claim 8, wherein the video stream comprises a live video and the request for the one or more time slices of the video stream is associated with a video-on-demand.

15. A system comprising: one or more processors;
 and a memory coupled to the processors comprising instructions executable by the processors, the processors being operable when executing the instructions to:
 generate a time map associated with a video stream, the time map comprises one or more time slices;
 identify a non-relevant time frame associated with a non-relevant portion of the video stream;
 associate a comment associated with the video stream with one or more of the time slices, wherein the comment is associated with a localized comment time stamp;
 in response to a request for the one or more of the time slices associated with the localized comment time stamp, transform the time map by synchronizing the localized time stamp to a counterpart time in the time map associated with the video stream excluding the non-relevant time frame based in part on the non-relevant time frame; and
 send information regarding the comment and the synchronized comment time stamp to one or more client devices.

16. The system of claim 15, wherein transforming the localized comment time stamp to a synchronized comment time stamp by synchronizing the localized comment time stamp to a counterpart time in the time map associated with the video stream excluding the non-relevant time frame based in part on the non-relevant time frame further comprises:
 shifting the localized comment time stamp by a period of time associated with the identified non-relevant portion of the video stream.

17. The system of claim 15, wherein the processors are further operable when executing the instructions to:
 determine whether the localized comment time stamp is within the time frame associated with the non-relevant time frame of the video stream; and
 wherein transforming the time map by synchronizing the localized comment time stamp to a counterpart time in the time map based in part on the non-relevant time frame further comprises shifting the localized comment time stamp associated with the video stream excluding the non-relevant time frame to a neighboring time slice in the time map when the localized comment time stamp is within the time frame associated with the non-relevant portion of the video stream.

18. The system of claim 15, wherein the processors are further operable when executing the instructions to:
 determine whether the localized comment time stamp is outside the time frame associated with the non-relevant time frame of the video stream; and
 wherein sending information regarding the comment and the synchronized comment time stamp occurs when the localized time comment time stamp is outside the time frame associated with the non-relevant portion of the video stream.

19. The system of claim 15, wherein the time map associated with the video stream comprises an audio time map associated with the video stream.

20. The system of claim 15, wherein the processors are further operable when executing the instructions to:
 store the comment and the synchronized comment time stamp;
 receive a second request for the one or more time slices of the video stream; and
 send information regarding the comment and the synchronized comment time stamp to the one or more client devices.

* * * * *